(12) United States Patent
Schmidlin

(10) Patent No.: US 7,978,122 B2
(45) Date of Patent: Jul. 12, 2011

(54) OBJECT SENSING SYSTEM

(75) Inventor: Michael J. Schmidlin, Madison Heights, MI (US)

(73) Assignee: TK Holdings Inc., Auburn Hills, MI (US)

( * ) Notice: Subject to any disclaimer, the term of this patent is extended or adjusted under 35 U.S.C. 154(b) by 188 days.

(21) Appl. No.: 12/461,489

(22) Filed: Aug. 13, 2009

(65) Prior Publication Data

US 2011/0037640 A1 Feb. 17, 2011

(51) Int. Cl.
*G01S 13/00* (2006.01)
*G08G 1/017* (2006.01)

(52) U.S. Cl. ............... 342/55; 342/52; 342/70; 340/937

(58) Field of Classification Search .............. 342/52–55, 342/70–72; 701/117–119; 340/937
See application file for complete search history.

(56) References Cited

U.S. PATENT DOCUMENTS

| | | | | |
|---|---|---|---|---|
| 5,935,190 A | * | 8/1999 | Davis et al. | 701/119 |
| 6,057,754 A | * | 5/2000 | Kinoshita et al. | 340/435 |
| 6,580,385 B1 | * | 6/2003 | Winner et al. | 342/70 |
| 7,205,904 B2 | * | 4/2007 | Schofield | 340/903 |
| 7,355,524 B2 | * | 4/2008 | Schofield | 340/903 |
| 7,358,889 B2 | * | 4/2008 | Abe et al. | 342/70 |
| 7,417,580 B2 | * | 8/2008 | Abe et al. | 342/27 |
| 7,432,848 B2 | * | 10/2008 | Munakata | 342/52 |
| 7,551,103 B2 | * | 6/2009 | Schofield | 340/903 |
| 7,613,568 B2 | * | 11/2009 | Kawasaki | 701/301 |
| 7,706,978 B2 | * | 4/2010 | Schiffmann et al. | 701/301 |
| 7,765,065 B2 | * | 7/2010 | Stiller | 701/301 |
| 7,777,669 B2 | * | 8/2010 | Tokoro et al. | 342/70 |
| 7,782,179 B2 | * | 8/2010 | Machii et al. | 340/435 |
| 7,825,849 B2 | * | 11/2010 | Tsuchida et al. | 342/70 |
| 7,839,303 B2 | * | 11/2010 | Kumon et al. | 340/937 |
| 2006/0091654 A1 | * | 5/2006 | De Mersseman et al. | 280/735 |
| 2011/0037640 A1 | * | 2/2011 | Schmidlin | 342/55 |

* cited by examiner

*Primary Examiner* — Thomas H. Tarcza
*Assistant Examiner* — Peter Bythrow
(74) *Attorney, Agent, or Firm* — Foley & Lardner LLP

(57) ABSTRACT

An object sensing system includes a radar system including at least one aperture through which a radar signal is transmitted and at least one aperture through which reflected radar signals are received. The sensing system also includes a stereo vision system including a first sensor and a second sensor. The first sensor and the second sensor are separated by an offset. The stereo vision system is mounted to the radar system to form a single assembly. The radar system is positioned in the offset between the first sensor and the second sensor.

20 Claims, 3 Drawing Sheets

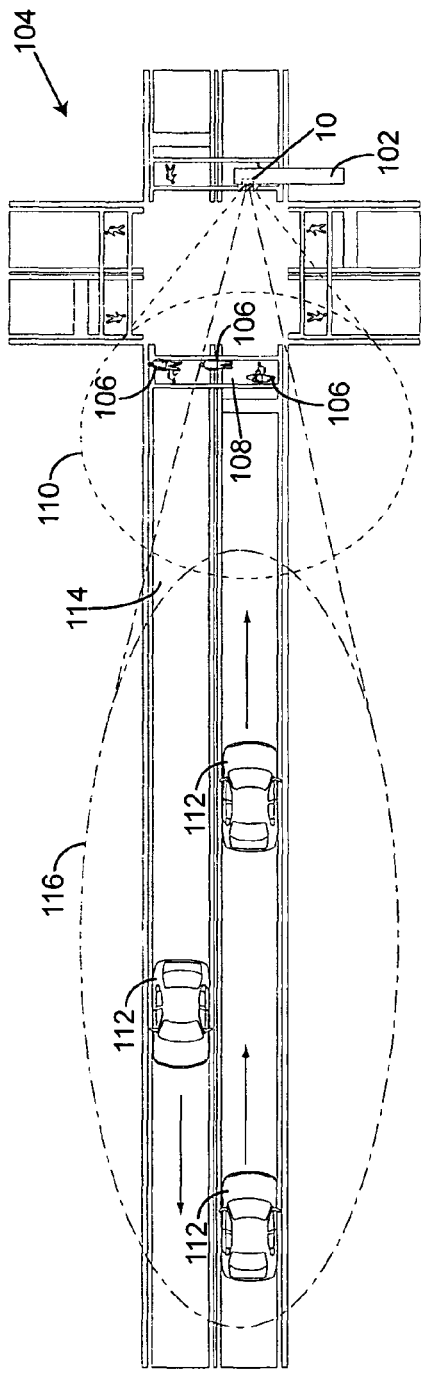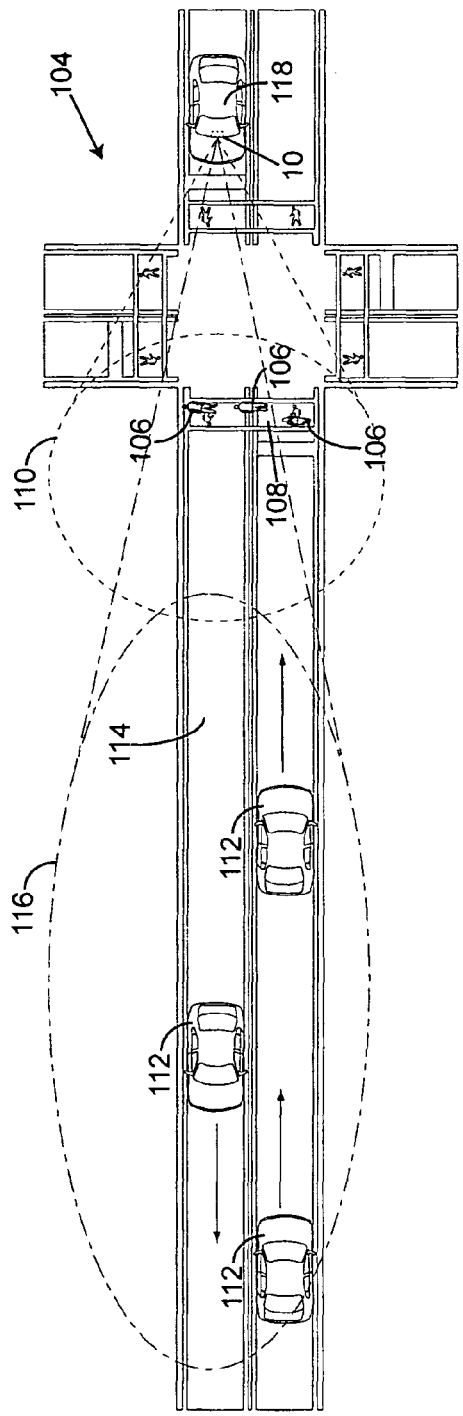
FIG. 6
FIG. 7

OBJECT SENSING SYSTEM

BACKGROUND

The present disclosure relates generally to the field of radar and stereo vision sensing systems. More particularly, the disclosure relates to a system including both radar and stereo vision sensors.

SUMMARY

One embodiment of the disclosure relates to an object sensing system. The object sensing system includes a radar system comprising at least one aperture through which a radar signal is transmitted and at least one aperture through which reflected radar signals are received. The sensing system also includes a stereo vision system comprising a first sensor and a second sensor. The first sensor and the second sensor are separated by an offset. The stereo vision system is mounted to the radar system to form a single assembly. The radar system is positioned in the offset between the first sensor and the second sensor.

Another embodiment of the disclosure relates to a method for assembling a radar and stereo vision system. The method includes the steps of mounting a radar assembly to an apparatus, adjusting an elevation angle of the radar assembly with respect to the apparatus, mounting a stereo vision assembly to the radar assembly such that the radar assembly is positioned between a first sensor and a second sensor of the stereo vision assembly, adjusting an offset between the first sensor and the second sensor of the stereo vision assembly, and adjusting an elevation angle of the stereo vision assembly with respect to the radar assembly.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 6 is an overhead view of an intersection and an intersection monitoring system including the apparatus of FIG. 1 according to an exemplary embodiment.

FIG. 7 is an overhead view of the intersection of FIG. 6 and a vehicle including the apparatus of FIG. 1 according to an exemplary embodiment.

DETAILED DESCRIPTION

Stereo vision sensor technology can be used to detect objects and estimate the position of objects in three dimensions. The detection and estimation can be obtained from a slightly different projection of the objects on two camera sensors positioned with a horizontal offset between them. The difference between the images of the two sensors is called horizontal disparity. This disparity is the source of the information for the third dimension.

A typical stereo vision sensor may be equipped with two identical camera sensors with parallel boresight vectors. The two sensors are positioned with an offset in a direction that is orthogonal to the boresight vectors. This offset or separation is called the baseline separation. The baseline separation and the tolerance of collinearity between the boresights of the two vision sensors impact the three-dimensional accuracy.

A radar, for example a monopulse radar, is typically equipped with two receive and/or two transmit apertures with a boresight angle and relative positioning that is chosen in a way similar to the stereo vision sensor described above. For example, in a radar with two receive apertures, the back scatter from a target that reaches one of the receive apertures typically reaches the other aperture with a slightly longer or shorter return path length. The difference in the return path length is used to compute the angle of the target with respect to a reference angle.

A patch antenna is a cost effective antenna design that is etched onto one side of a radio frequency (RF) substrate and fed from the other side of the substrate. Patch antennas are advantageously very thin.

Figure 1:
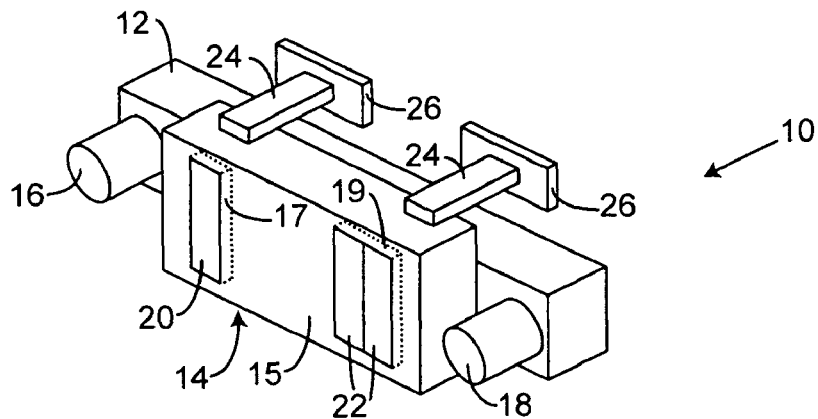
FIG. 1 is a perspective view of an apparatus including a radar system and a stereo vision system according to an exemplary embodiment.

Referring to FIG. 1, an object sensing system or apparatus 10 includes both a stereo vision system (SVS) 12 and a radar system 14 in a single assembly. SVS 12 includes a housing 13 and is configured to detect objects and estimate the position of objects in three dimensions. The detection and estimation can be obtained from a slightly different projection of the objects on two camera sensors 16, 18 (binocular sensors) positioned with a horizontal offset between them. The horizontal disparity between the images of the two sensors 16, 18 is the source of the information for the third dimension. According to some exemplary embodiments, camera sensors 16, 18 may be identical or substantially identical with generally parallel boresight vectors. Camera sensors 16, 18 are positioned with an offset or baseline separation in a direction orthogonal to the boresight vectors. The baseline separation may be adjusted to change the tolerance of collinearity between the boresights of the two vision sensors 16, 18 and impact the three-dimensional accuracy. It is noted that according to various exemplary embodiments, SVS 12 may be any SVS of past, present, or future design that has an offset between the camera sensors.

Radar system 14 includes a housing 15 surrounding a transmitter 17 and a receiver 19. The housing includes a transmit aperture 20 through which a radar signal is transmitted and two receiving apertures 22 through which reflected radar signals are received. The boresight or elevation angle and relative positioning of the aperture 20 and the apertures 22 is chosen in a way similar to the stereo vision sensor 12 described above. According to other exemplary embodiments, the housing of radar system 14 may include a transceiver and the housing may include a single transmit/receive aperture. According to still other exemplary embodiments, the housing may include more than one transmit aperture and receive aperture. Radar system 14 also includes arms 24 and pads 26 for mounting to another surface or system. For example, in a radar 14 with two receive apertures 22, the back scatter from a target may reach one of the receive apertures 22 with a slightly longer or shorter return path length than at the other receive aperture 22. The difference in the return path length is used to compute the angle of the target with respect to a reference angle (e.g., the angle in which the radar system 14 is directed). According to some exemplary embodiments, the radar system 14 may be any monopulse radar system, while in other exemplary embodiments, other radar systems may be used. According to some exemplary embodiments, the radar system 14 may be a patch antenna radar system. According to some exemplary embodiments, the radar system 14 may operate in a frequency band of between 50 and 100 GHz. According to other exemplary embodiments, the radar system may operate at about 77 GHz.

The object sensing system 10 makes use of the baseline separation between the two camera sensors 16, 18 and the relatively thin qualities of the monopulse patch antenna radar system 14. The object sensing system 10 utilizes the baseline separation of the camera sensors 16, 18 as a location for the radar system 14 and any associated processing electronics. The construction of the system 10 generally provides for an efficient radar-SVS assembly. The mounting arrangement of the system 10 is generally compact and puts much of the mechanical strain on the radar enclosure 14 because it has higher mechanical tolerances than the SVS 12, which may be susceptible to vibration. Further, aesthetics of separately mounted independent sensor assemblies in a sensor fusion system may be improved by this more compact package.

The radar system 14 is generally accurate at longer distances and for measuring speed (e.g., a distant oncoming vehicle) while the SVS 12 is generally more accurate at shorter distances than the radar system and for object identification (e.g., detection of pedestrians or nearby immobile objects). Therefore, the use of the SVS 12 and the radar system 14 together may allow for accurate detection and measurement of objects at a wider range of distances.

Figure 2:
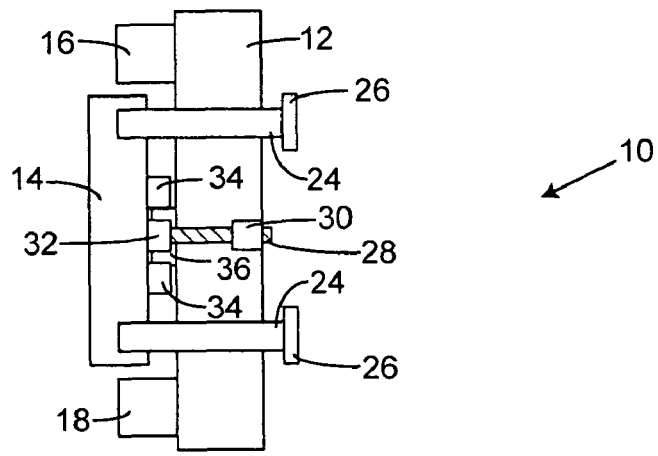
FIG. 2 is an overhead view of the apparatus of FIG. 1 according to an exemplary embodiment.

Referring to FIG. 2, an overhead view of the object sensing system 10 illustrates that the radar system 14 and the SVS 12 are coupled together by a screw 28. Screw 28 threads through a housing 30 of SVS 12 and into a housing 32 of radar system 14. The boresight or elevation angles of the SVS 12 and the radar system 14 are not intended to be collinear and the screw 28 allows for elevation angle adjustment to sets the relative angle offset between the SVS 12 and the radar system 14. The screw 28 may be tied to a calibrated absolute position encoder so that a control system or software knows the relative elevation angle difference between the SVS 12 and the radar system 14. The SVS 12 is also coupled to the radar system 14 at a pivot point by a pivot mechanism (e.g., hinge) that includes two projections 34 (e.g., a tab, a boss, etc.) of the radar system 14 and a projection 36 (e.g., a tab, a boss, etc.) of the SVS 12. The projection 36 of the SVS 12 is generally of a width configured to fit between the projections 34 of the radar system 14. As illustrated in greater detail in FIGS. 4 and 5, projections 34 and projection 36 define a hole for receiving a pin so that the SVS 12 can pivot or rotate relative to the radar system 14.

Figure 3:
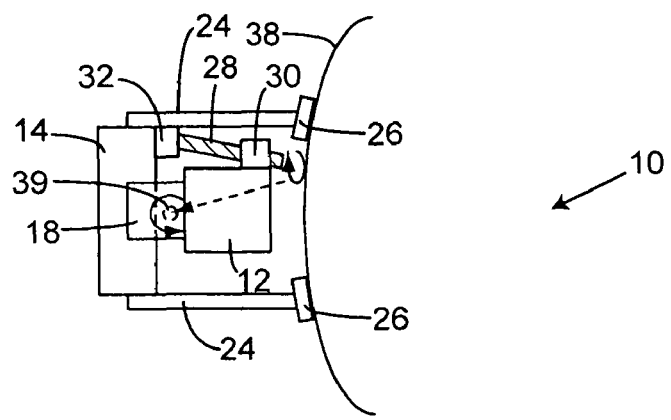
FIG. 3 is a side view of the apparatus of FIG. 3 showing adjustment of the stereo vision system according to an exemplary embodiment.

Referring to FIG. 3, a side view of the object sensing system 10 further illustrates how screw 28 may be used to adjust the angle of SVS 12 relative to radar system 14. Pads 26 of radar system 14 are mounted to a surface 38, for example a traffic monitoring system, a vehicle, etc. Once the radar system 14 is calibrated for detection in a specific range or area (e.g., the boresight or elevation angle), the SVS 12 can be calibrated for an at least partially different range by adjusting the offset between the sensors 16, 18 and the elevation or boresight angle of the SVS 12.

The elevation or boresight angle can be adjusted by rotating the screw 28 (e.g., clockwise or counter-clockwise). The screw 28 is coupled between SVS 12 and radar system 14 at an angle so that when the screw 28 is rotated, the SVS 12 moves both vertically and horizontally and rotates about a pivot point 39 of the pivot mechanism defined by the projections 34 of radar system 14 and the projection 36 of SVS 12. According to various exemplary embodiments, the screw 28 may be adjusted manually or may be adjusted automatically by a motor. While the illustrated exemplary embodiments show the use of a screw 28 to adjust the SVS 12 relative to the radar system 14, according to other exemplary embodiments, other fasteners and methods of adjustment may be used. Relative calibration of the SVS 12 and the radar system 14 in a monitoring system may be easier than stand-alone sensors, and since the position of the SVS 12 and the radar system 14 is fixed—though adjustable—only one sensor may require an in-depth calibration with respect to the sensing environment.

Figure 4:
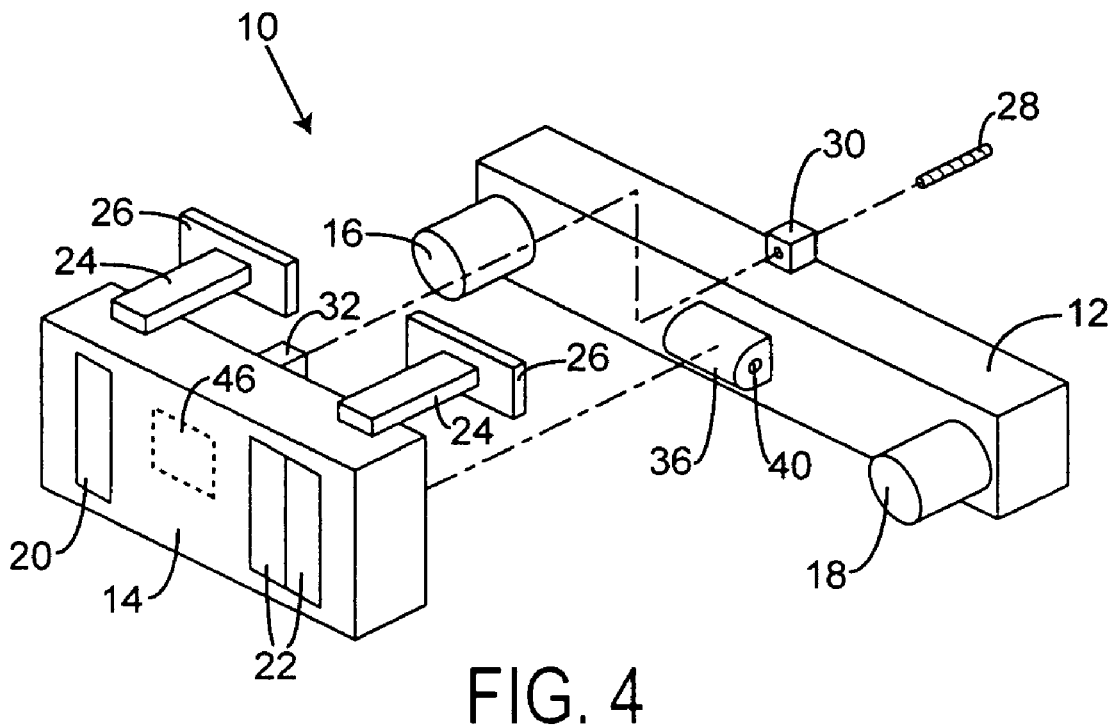
FIG. 4 is an exploded perspective view of the apparatus of FIG. 1 according to an exemplary embodiment.
Figure 5:
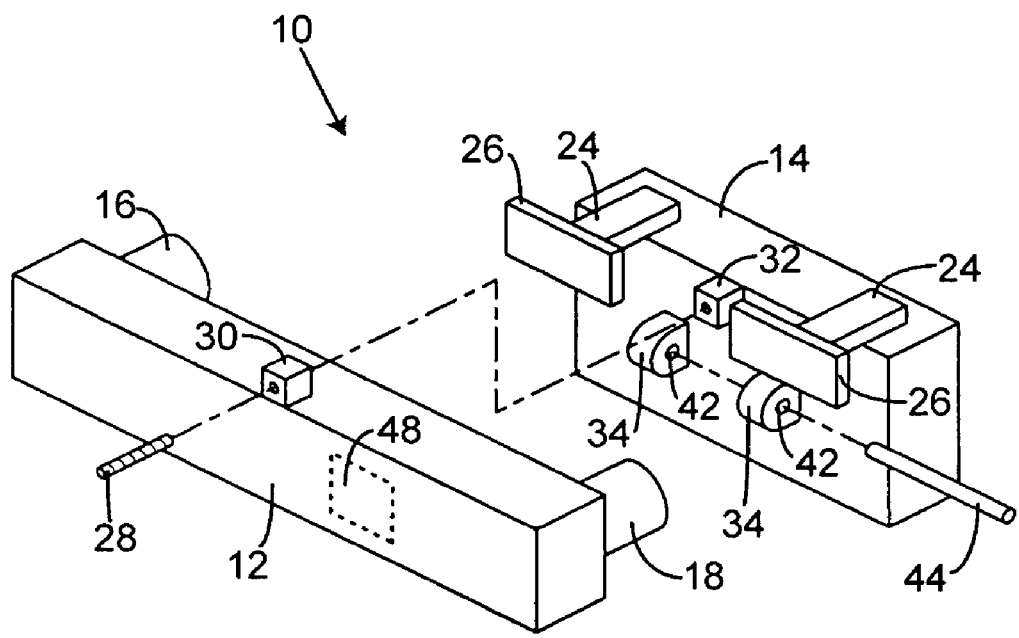
FIG. 5 is another exploded perspective view of the apparatus of FIG. 1 according to an exemplary embodiment.

Referring to FIGS. 4 and 5, exploded views of the object sensing system 10 further illustrate the mounting of the SVS 12 to the radar system 14. The camera sensors 16, 18 of the SVS 12 are positioned around the radar system 14 and the projection 36 of the SVS 12 is configured to mount between the projections 34 of the radar system 14. The projection 36 of the SVS 12 defines a hole 40 and the projections 34 of the radar system 14 each define a hole 42. When the projection 36 of SVS 12 is placed between the projections 34 of the radar system 14, the holes 40, 42 line up and are configured to receive a pin 44. As shown above, the screw 28 is threaded through two housings 30, 32 at an angle and can be rotated to move SVS 12 in the vertical plane. Pin 44 acts as a pivot point for the pivot mechanism formed by the projections 34, 36 when the screw 28 is rotated to adjust the elevation or boresight angle of the SVS 12 relative to the radar system 14. According to other exemplary embodiments, the horizontal angle of the camera sensors 16, 18 of the SVS 12 can be adjusted in addition to or instead of the vertical rotation about pin 44.

By collocating the SVS 12 and the radar system 14 as illustrated, a cost and materials savings can be realized. For example, a single power supply 46 can be housed in the larger radar assembly 14 and can be shared with the SVS 12. In another example, the shared physical space of the SVS 12 and the radar system 14 can allow for very short cable lengths running between them. Further, processing for the SVS 12 and the radar system 14 can be executed in the same hardware (e.g., processing circuit 48) as a result of the shared physical space. Further still, diagnostics and calibration software can be shared by the SVS 12 and the radar system 14. While the power supply 46 is illustrated in a housing of the radar system 14 and the processing circuit 48 is illustrated in a housing of the SVS 12, according to other exemplary embodiments, the power supply 46 may be located in the housing of the SVS 12 and the processing circuit 48 may be located in the housing of the radar system 14. According to other exemplary embodiments, the power supply 46 and the processing circuit 48 may both be located in one of the radar system 14 housing or the SVS 12 housing. According to still other exemplary embodiments, one or both of the power supply 46 and the processing circuit 48 may be located remotely from the radar system 14 housing and the SVS 12 housing.

It is noted that while FIGS. 4 and 5 illustrate two arms 24 and pads 26 for mounting the object sensing system 10, according to other exemplary embodiments, the object sensing system 10 may include four arms 24 and pads 26 for mounting. According to still other exemplary embodiments, the object sensing system 10 may include one arm 24 and pad 26, three arms 24 and pads 26, or more than four arms 24 and pads 26.

Referring to FIG. 6, the object sensing system 10 is mounted in a traffic or intersection monitoring system 102. The traffic monitoring system 102 is generally configured to identify objects near an intersection 104 as well as their the location and speed so that traffic lighting can be adjusted or so violations are reported. For example, object sensing system 10 may identify pedestrians 106 proceeding in a crosswalk 108 and their locations using the SVS 12 in a short range detection area 110 around the cross walk 108. The object sensing system 10 may also detect vehicles 112 and their speed traveling down a road 114 leading to the intersection 104 and the crosswalk 108 using the radar system 14 over a longer range detection area 116. The traffic monitoring system 102 may adjust traffic lighting based on detection of vehicles 112 or pedestrians 106 and may record any traffic violations that occur (e.g., if a vehicle 112 runs a red light). The object sensing system 10 may provide a compact and aesthetic intersection monitoring sensor for the traffic monitoring system 102.

Referring to FIG. 7, in a similar scenario to FIG. 6, the object sensing system 10 may be mounted in a vehicle 118. The apparatus may allow the vehicle 118 to detect the pedestrians and the vehicles 112. The detection of a vehicle 112 or pedestrian 106 in the path of the vehicle 118, may prompt generation of a visual or audible warning message for the driver. Additionally, the object sensing system 10 may allow the vehicle 118 to provide the driver with an indication of obstacles that may be detected by the radar system 14 further ahead of the vehicle and that may not be easily visible by the driver due to fog, precipitation, etc. Further, the object sensing system 10 may be used to alert the driver of the speed of vehicles 112 ahead of the vehicle 118 and travelling in the same direction, for example to alert of a slow vehicle. Such an assembly as object sensing system 10 may be heavier than a standalone SVS sensor that is typically mounted behind a windshield, but the object sensing system 10 may have greater feasibility for mounting behind the windshield.

It is noted, for the sake of simplicity, that the object sensing system 10 shown in FIGS. 1-5 does not include additional features that may be incorporated, such as camera protective shrouds, details of adjustment (e.g., pretensioners, alignment angle sensors, etc.), intentional elongation of the camera sensors, etc. The system 10 may include any or all of these additional features or components as needed. The present disclosure has been described with reference to exemplary embodiments, however workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

What is claimed is:

1. An object sensing system, comprising:
 a radar system comprising at least one aperture through which a radar signal is transmitted and at least one aperture through which reflected radar signals are received; and
 a stereo vision system comprising a first sensor and a second sensor, the first sensor and the second sensor separated by an offset, the stereo vision system mounted to the radar system to form a single assembly, the radar system positioned in the offset between the first sensor and the second sensor.

2. The apparatus of claim 1, wherein the offset separating the first sensor and the second sensor is adjustable.

3. The apparatus of claim 1, wherein an elevation angle of the stereo vision system is adjustable relative to the elevation angle of the radar system.

4. The apparatus of claim 3, wherein the stereo vision system is rotatable about a pivot point coupling the stereo vision system and radar system together.

5. The apparatus of claim 3, wherein the elevation angle of the stereo vision system is adjusted by a screw coupling the stereo vision system to the radar system.

6. The apparatus of claim 1, wherein the radar system is a monopulse radar system.

7. The apparatus of claim 1, wherein the radar system comprises two receive apertures or two transmit apertures.

8. The apparatus of claim 1, wherein the radar system is configured for detecting or estimating a position of a first object at a first range and the stereo vision system is configured for detecting or estimating a position of a second object at a second range.

9. The apparatus of claim 8, wherein the first range is farther from the radar system than the second range.

10. The apparatus of claim 1, wherein the system is configured to be mounted in a vehicle.

11. The apparatus of claim 1, further comprising a power supply configured to power both the radar system and the stereo vision system.

12. The apparatus of claim 11, wherein the power supply is located in a housing containing a radar transmitter and a radar receiver.

13. The apparatus of claim 1, further comprising a signal processing circuit for processing signals generated and received by both the radar system and the stereo vision system.

14. A method for assembling a radar and stereo vision system, the method comprising the steps of:
mounting a radar assembly to an apparatus;
adjusting an elevation angle of the radar assembly with respect to the apparatus;
mounting a stereo vision assembly to the radar assembly such that the radar assembly is positioned between a first sensor and a second sensor of the stereo vision assembly;
adjusting an offset between the first sensor and the second sensor of the stereo vision assembly; and
adjusting an elevation angle of the stereo vision assembly with respect to the radar assembly.

15. The method of claim 14, wherein adjusting an elevation angle of the stereo vision assembly comprises actuating a screw coupling the stereo vision assembly to the radar assembly, the stereo vision assembly rotatable about a pivot point coupling the stereo vision assembly and radar assembly together.

16. The method of claim 14, wherein adjusting the offset the first sensor and the second sensor of the stereo vision assembly comprises adjusting the position of only one of the first sensor and the second sensor with respect to the other sensor.

17. The method of claim 14, wherein the radar assembly is a monopulse radar assembly comprising two receive or two transmit apertures.

18. The method of claim 14, wherein the radar assembly is configured for detecting or estimating a position of a first object at a first range and the stereo vision assembly is configured for detecting or estimating a position of a second object at a second range.

19. The method of claim 14, further comprising the step of: mounting the radar and stereo vision assembly in a vehicle or in an intersection monitoring system.

20. The method of claim 14, further comprising the step of: mounting a power supply to the radar assembly, the power supply configured to power both the radar assembly and the stereo vision assembly.

* * * * *